Dec. 19, 1933.  W. L. PAUL  1,940,061
DRAFT CONNECTION
Filed Jan. 31, 1929  2 Sheets-Sheet 1
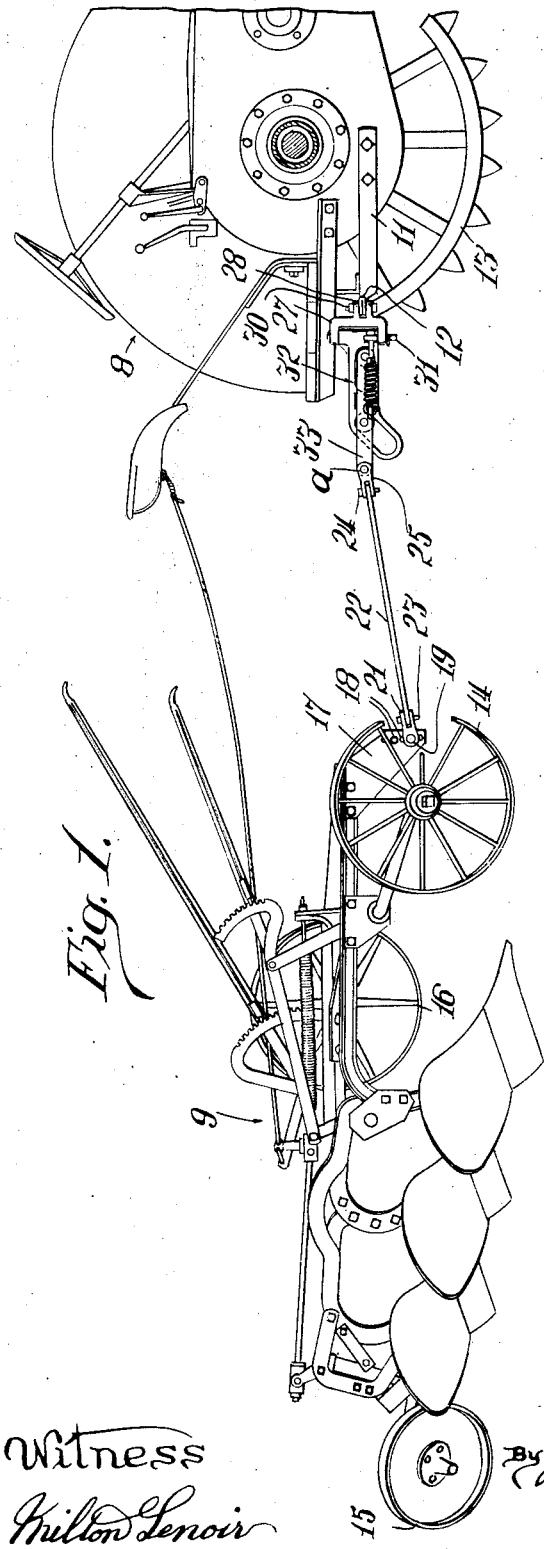
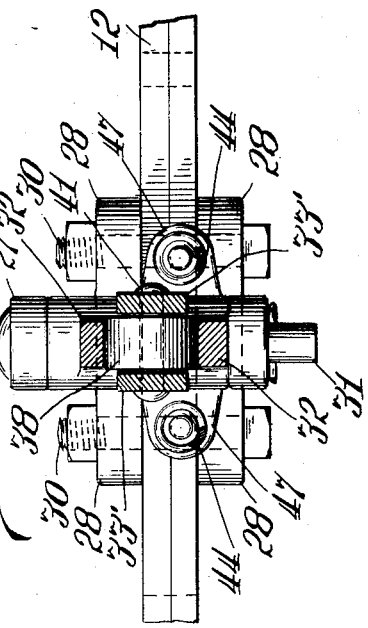
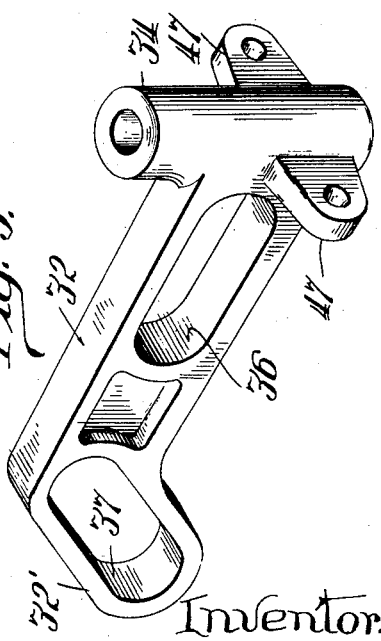
Inventor.
William L. Paul
By Brown, Jackson, Boettcher & Dienner,
Attorneys
Witness
Milton Lenoir

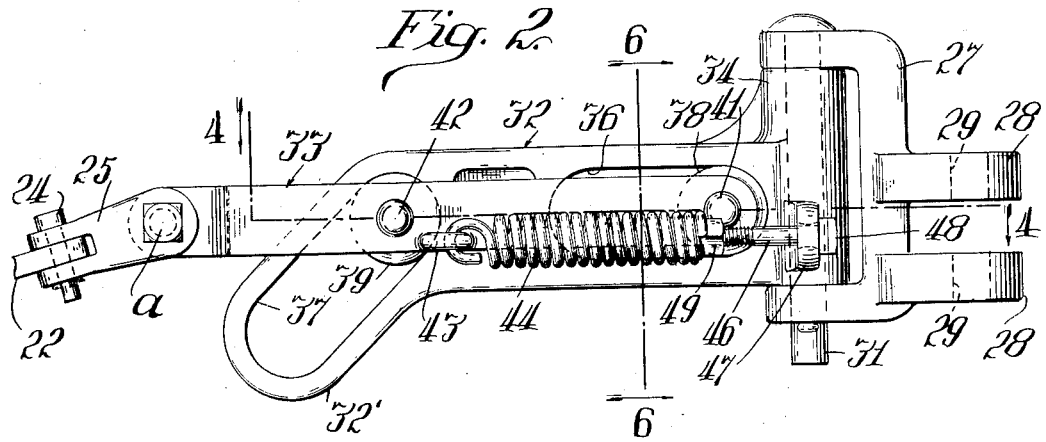
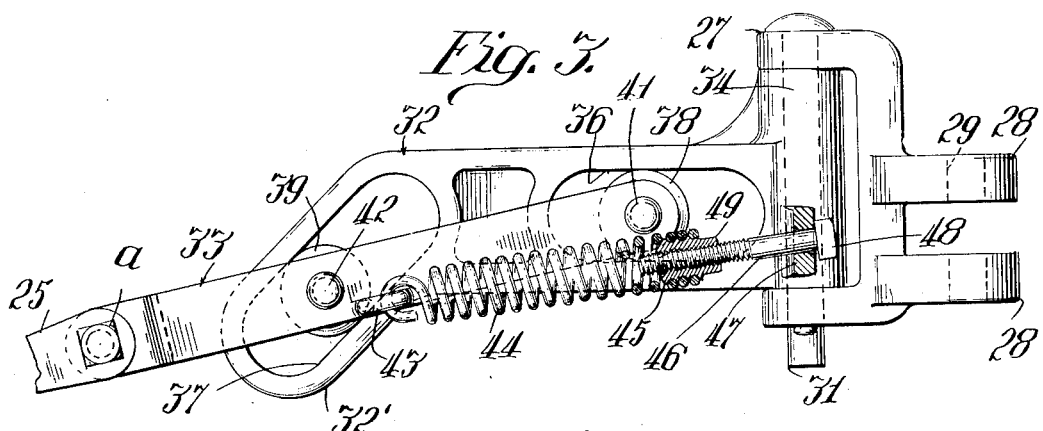
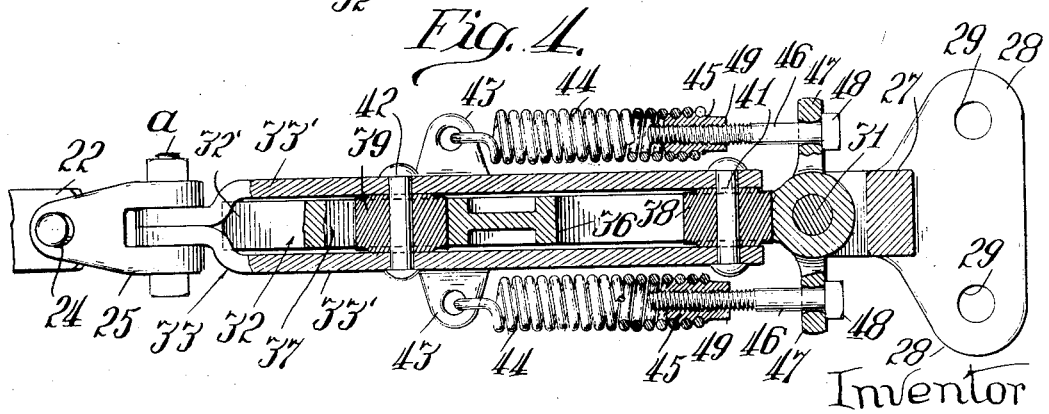

Patented Dec. 19, 1933

1,940,061

UNITED STATES PATENT OFFICE 1,940,061

DRAFT CONNECTION

William L. Paul, Berkeley, Calif., assignor to Deere & Company, Moline, Ill., a corporation of Illinois Application January 31, 1929. Serial No. 336,562

14 Claims. (Cl. 280—33.9)

The present invention relates to draft connections such as are employed between a tractor and a farm implement, and possibly in other like relations of pulling and pulled vehicles.

The principal object of the invention is to provide a draft connection which will function automatically to change the height of the hitch point between the tractor and the implement with changes in the draft force transmitted to the implement. More particularly, the device operates to lower the hitch point when the draft pull becomes relatively heavy or excessive, thereby securing the benefit of a lower point of hitch on the tractor while this condition remains. The advantage of such construction is that the inherent tendency of the front end of the tractor to tilt upwardly under excessive draft pull is resisted, and a more nearly uniform load is maintained on the front tractor wheels for more effective steering.

When the implement is being pulled at a normal draft load, the hitch point is maintained at a normal or moderately high point, such being desirable to give clearance and for other reasons, but when the draft pull of the implement becomes abnormally heavy, the effective hitch point is automatically lowered to compensate for this condition.

Other objects of the invention are:—

To embody such a draft connection in a swinging type of hitch which will have the above described operation, regardless of the angle between the tractor and the implement;

To provide such a draft connection characterized by spring means having the further advantage of absorbing shock or affording a spring relief in the line of draft to prevent breakage of the implement or draft connections if the implement should strike an obstruction; and to provide adjusting means associated with this spring means whereby the automatic lowering of the hitch point can be made to occur at different draft loads.

Referring to the accompanying drawings wherein I have illustrated a preferred embodiment of my invention:—

Fig. 1 is a fragmentary side view, partly in section, illustrating my improved draft connection between a tractor and a plow;

Fig. 2 is a side elevational view of the draft connection, showing the relation of the parts when operating under a normal or relatively light draft load;

Fig. 3 is a similar view, partly in section, illustrating the relation of the parts under a heavier draft load;

Fig. 4 is a horizontal sectional view through the connection, taken approximately on the plane of the line 4—4 of Fig. 2;

Fig. 5 is a perspective view of one of the members of the connection; and

Fig. 6 is a vertical sectional view taken on the plane of the line 6—6 of Fig. 2.

Referring to Fig. 1, the rear portion of a conventional type of farm tractor is generally indicated at 8, and a wheeled gang plow typifying any farm implement of relatively heavy draft is indicated at 9. The present draft connection is applicable to any standard location or arrangement of draft frame or draft bar on the tractor and, as illustrative of the latter, the tractor 8 is shown as being provided with a draft frame 11 having a transverse draft bar 12. Such draft frame is usually secured to the main frame of the tractor or to the housing enclosing the rear wheel drive mechanism, at a height to dispose the draw bar 12 below the axis of the rear traction wheels 13.

In Fig. 1 the near wheel 13 has been broken away to illustrate the attachment of the present draft connection to such standard arrangement of draft frame. Because of its ability to automatically lower the hitch point in the event of excessive draft pull, the present draft connection may, if desired, be mounted on the tractor at a higher point than usual.

The plow 9 chosen to exemplify a heavy draft implement comprises the usual frame having front and rear furrow wheels 14 and 15 and a land wheel 16. A draft plate or bracket 17 is usually secured to the frame and provided with a series of vertically spaced holes 18 for receiving at different heights a transverse draft pin 19 on which a draft clevis 21 is pivoted. A bar 22 is shown as being pivoted to the clevis 21 by a vertical pin 23 for horizontal swinging movement. The forward end of said bar is similarly pivoted by a pin 24 to a clevis 25 which in turn is mounted for vertical movement on the horizontal pivot $a$. Such pivot $a$ constitutes the hitch point between the tractor and implement which is caused to lower automatically with increased draft between the two vehicles.

Referring to Figs. 2, 3, etc., the improved draft connection comprises a vertical, yoke-shaped bracket 27 having spaced ears or lugs 28, 28 projecting therefrom to engage the upper and lower sides of the transverse draw bar 12 on the tractor. Aligned holes 29 in such lugs receive pins or bolts 30 passing down through holes in the draw bar 12 for fixedly connecting the bracket 27 to the draw bar.

Extending between the arms of the bracket 27 is a pivot pin 31 relatively to which the two draft members constituting the draft connection have horizontal swiveling movement. These two main draft members are designated 32 and 33, the latter carrying the pivot bolt *a* constituting the hitch point for the draft load. The member 32 is in the form of a relatively long arm having a vertical bearing boss 34 at one end which is swiveled on the pivot pin 31 between the arms of the bracket 27. The cooperating draft member 33 is in the form of a yoke embracing the sides of the draft member 32, being constructed of two parallel bars 33', 33' (Fig. 4) having their rearward ends bent together for extending into the clevis 25. The bolt *a*, constituting the pivotal hitch point, extends through these rear ends of the bars 33'.

Formed in the forward portion of the draft member 32 is a horizontal slot 36 extending entirely through the member 32. The rear portion of such member is provided with a downwardly projecting portion 32', and formed in such portion is a downwardly and rearwardly inclined slot 37 which is also open on both sides. The companion draft member 33 carries two rollers 38 and 39 which track in these slots 36 and 37, respectively. As shown in Fig. 4, said rollers are mounted on pivot pins 41 and 42 extending between the side bars of the yoke-shaped draft member 33, and these rollers are of sufficient width to space said side bar portions slightly from the sides of the draft member 32 to avoid frictional binding in the relative movement between the two draft members.

Projecting outwardly from the two bars 33' are apertured ears 43 in which the rearward ends of tension springs 44 are hooked. The front ends of said springs are rigidly secured to sleeve-like coupling members or nuts 45, the latter having exterior grooves in which the ends of the springs are tightly wound. Adjusting bolts or screws 46 screw through threaded bores in the members 45 and have their shanks extending forwardly through apertured ears 47 projecting from the draft member 32, with the heads 48 of said bolts engaging on the forward sides of said ears. The apertures in the ears 47 accommodate angular tilting movement of the bolts 46 in the operation of the device. To adjust the tension of the springs 44 the bolts 46 are screwed inwardly or outwardly in the connecting members 45, and to hold such members in making this adjustment the forward ends thereof are made square or polygonal, as indicated at 49 (Fig. 2) so that the same can be held by a wrench and prevented from rotating with the bolts 46.

In the operation of the device, the combined tension of the two springs 44 reacting against a normal or relatively light draft load will tend to hold the draft member 33 forwardly in the upper position illustrated in Fig. 2. It will be noted that under these conditions the variable draft pivot or hitch point *a* is disposed relatively high, approximately in the horizontal plane of the draft frame 11 on the tractor. When the draft pull increases, the springs 44 yield, allowing the draft member 33 to move rearwardly, which, by virtue of the guiding influence of the rollers 38, 39 moving in the guide slots 36, 37, causes the rear end of the draft member 33 to be deflected downwardly, thereby carrying the pivotal hitch point *a* down to a lower height relatively to the tractor. When an extremely high draft resistance is encountered, the draft member 33 will continue to move rearwardly and downwardly until the rollers 38, 39 engage the ends of their guide slots 36, 37, whereupon the two draft members 32 and 33 become, in effect, a rigid unit. At this time the pivotal draft point *a* is carried down to its lowest point relatively to the tractor.

It will be evident that this lowering of the effective height of the hitch or coupling point *a* lowers the line along which draft force is transmitted from the tractor to the implement, and thus counteracts the inherent tendency of the front end of the tractor to tilt upwardly under excessive draft loads. Such makes for safer operation and also holds the front tractor wheels down with a more uniform pressure, thereby maintaining the normal steering efficiency of these front wheels, even under abnormal draft load.

Simultaneously with the lowering of the hitch point under excessive draft load, the springs 44 are functioning as a spring relief to absorb shock and prevent breakage of the coupling parts or of the implement, such being of particular value when the increased draft resistance is suddenly encountered. As soon as the implement moves past the point of abnormal draft resistance the springs 44 will return the draft member 33 to its former position with the hitch point *a* raised to its more desirable height for clearance.

The tension of said springs may be adjusted to yield at any predetermined draft load or to permit the draft member 33 to assume any relative position under normal draft load, but I consider it preferable to so adjust said springs that, under the desired normal draft pull of the tractor, the draft member 33 will be retained in the upper position substantially as illustrated in Fig. 2. Only one spring may be employed instead of the two shown, or a compression spring may be utilized to resist the draft load. The ability of the draft connection to swivel about the vertical pivot pin 31 permits the draft member 33 to yield and lower even when the tractor and implement are at an angle to each other, as in turning. The considerable spacing between the upper and lower arms of the yoke-shaped bracket 27 affords lengthy bearing support for the draft connection 32—33 in its swiveled mounting on the vertical pivot pin 31 so that the draft connection is rigid vertically with respect to the tractor. It will be noted that the downward inclination of the rear guide slot 37 functions under abnormal load to transmit some positive lifting effect to the rear wheels of the tractor through the pivot pin 31 and bracket 27, which lifting effect is translated into downward pressure on the front steering wheels of the tractor. If desired, the guide slots 36 and 37 may be formed in the draft member 33 and the rollers may be carried by the member 32, or only one roller may be employed. Also, other inclined guide arrangements may be used in lieu of the slots and rollers.

By virtue of the flexibility established by the front and rear pivotal connections of the draft link 22, if the rear wheels of the tractor should drop into a depression such will merely result in relative angular movement occurring at the rear pivotal connection and the position or level condition of the plow or other implement will not be affected.

It will be understood that in the preceding description and in the appended claims, I have only used the expression "hitch point" in an illustrative sense for representing to better advantage the lowering of the effective line of draft; and that the actual coupling and uncoupling operation may be effected at any desired point in the line of draft connections between the tractor and the implement. It will be further understood that while the invention is illustrated in the exemplary embodiment as applied in a draft connection between a tractor and implement, its use is not limited thereto as it may be utilized in draft connections between any drawing vehicle and drawn vehicle or any other draft load or loads.

Having thus described my invention, what I claim as new and desire to secure by Letters Patent is:—

1. A draft connection between a tractor and an implement or the like, comprising cooperating members establishing a hitch point between the tractor and implement, said members being pivotally connected with the tractor on a vertical pivot rigid vertically with respect to the tractor, and means operative automatically to lower the effective height of said hitch point relatively to the tractor with an increase in draft load, both of said cooperating members swinging together about said pivot into the line of draft as the draft is deflected laterally with respect to the longitudinal center line of the tractor.

2. A draft connection between a tractor and an implement or the like comprising cooperating members establishing a hitch point between the tractor and implement, one of said members being adapted to be pivotally connected to the tractor on a vertical pivot, and means responsive to the draft load for deflecting one of said members downwardly to lower the effective height of said hitch point relatively to the tractor, whereby said cooperating members together swing into the line of draft as the draft is deflected laterally with respect to the longitudinal center line of the tractor.

3. A draft connection between a tractor and an implement or the like comprising two relatively movable cooperating slidable members for transmitting the draft, the implement being coupled to a hitch point on one of said members, and means responsive to the draft load for causing relative movement between said members to lower the effective height of said hitch point relatively to the tractor.

4. A draft connection between a tractor and an implement or the like comprising two relatively extensible members to which the draft is transmitted, one of said members being connected to the tractor by a fixed vertical pivot, the implement being coupled to the other one of said members at a hitch point thereon, and means responsive to extensible movement between said members under abnormal draft load for moving said hitch point in a vertical plane, said means, in the absence of extensible movement between said members, holding the hitch point against vertical movement.

5. A draft connection between a tractor and an implement comprising a first draft member adapted to be coupled to the tractor, a second draft member adapted to be coupled with the implement, said members being arranged for relative endwise movement, spring means for resisting such relative movement in opposition to the draft load, and guide means formed as a part of said first member for directing a portion of said second member downwardly upon relative endwise movement between said members.

6. A draft connection between a tractor and an implement or the like comprising a first draft member adapted to be coupled with the tractor, a second draft member comprising a hitch portion adapted to be coupled with the implement, means for coupling said members together; said means permitting said second draft member to be moved rearwardly relatively to said first draft member under draft load, spring means for resisting such relative movement between said members, and guide devices engaging said coupling means for directing the hitch portion of said second member downwardly upon relatively rearward movement of said second draft member.

7. A draft connection between a tractor and an implement or the like comprising a first draft member, means for coupling the same to the tractor permitting lateral swinging movement of said member, a second draft member, means for coupling the implement to said second draft member at a hitch point adjacent to the rear of said member, means connecting said members, said second member being movable rearwardly relatively to said first member under draft load, spring means for resisting such rearward movement of said second member, and guide means on said first member and engaging said member connecting means for directing said hitch point downwardly upon relative rearward movement of said second draft member.

8. A draft connection between a tractor and an implement or the like comprising a first draft member adapted to be coupled with the tractor, a second draft member, the implement being adapted to be coupled to a hitch point on said second member, said second draft member being movable rearwardly relatively to said first draft member under draft load, spring means for resisting such relative rearward movement of said second draft member, and guide rollers on one of said members cooperating with guide surfaces on the other of said members for directing the hitch point of said second draft member downwardly upon rearward movement of said latter draft member.

9. A draft connection between a tractor and an implement comprising a first draft member adapted to be coupled with the tractor, a second draft member adapted to be coupled with the implement at a hitch point on said second member, said second draft member being movable rearwardly relatively to said first draft member under draft load, spring means for resisting said rearward movement of said second member, an inclined guide slot formed in one of said members, and a roller carried by the other of said members and engaging in said guide slot for directing said hitch point downwardly upon rearward movement of said second draft member.

10. A draft connection between a tractor and a wheeled implement comprising an arm adapted to be coupled with the tractor, a yoke embracing said arm, means for coupling said implement to said yoke at a hitch point adjacent to the rear end of said yoke, said yoke being movable rearwardly relatively to said arm under draft load, spring means normally resisting such rearward movement of said yoke, said arm having a substantially horizontal slot in its forward portion and a downwardly and rearwardly inclined slot in its rearward portion, and rollers mounted between the sides of said yoke and engaging in said slots for deflecting the hitch point of said yoke downwardly upon relative rearward movement of said yoke.

11. A draft connection between a tractor and a farm implement having a front supporting wheel, comprising a yoke-shaped bracket adapted to be secured to the tractor, a vertical pivot pin extending between the arms of said bracket, a draft arm having a pivot boss at its front end swiveled on said pivot pin, a draft yoke comprising two bars embracing the sides of said draft arm, a pivot member carried by the rear portion of said yoke and constituting a hitch point between said yoke and the implement, draft linkage extending between said pivot member and the implement and capable of vertical and horizontal pivotal movement, the front portion of said draft arm having a substantially horizontal slot therein, the rear portion of said arm having a downwardly and rearwardly inclined slot therein, pivot pins extending between the side bars of said draft yoke through said slots, rollers mounted on said latter pivot pins within said slots, lugs projecting from the side bars of said draft yoke, tension springs connected with said lugs, lugs projecting outwardly from said draft arm, bolts rotatably mounted in said latter lugs, and nuts screwing over said bolts and to which said tension spring are connected, the tension of said springs being adjusted by screwing said bolts inwardly or outwardly in said nuts.

12. A draft connection between a drawing and a drawn implement, adapted to be pivotally mounted on the drawing implement for swinging movement only in a horizontal plane relative thereto, comprising two movable members, cooperating guide means on each of said members, means for coupling the drawn implement at a hitch point on one of said members, said members being movable relative to each other under draft load, said relative movement causing said guide means to change the position of the hitch point in a direction at right angles to the swinging movement of the draft connnection on the drawing implement, and means normally resisting such relative movement.

13. A connection for transmitting draft from one vehicle to another comprising two members, one of said members being adapted to be pivotally mounted on one vehicle for pivotal movement only in a horizontal plane and against movement in the opposite direction relative to that vehicle, the other vehicle being adapted to be connected to a hitch point at one end of the other member, guide surfaces on the first member, guide means on the other member, the other member being mounted on the first member with the guide means in cooperative relationship with the guide surfaces to permit said other member to slide relative to the first member under draft load and to cause said other member hitch point end to move in the direction against which the first member is held from moving, and spring means for resisting such relative movement in opposition to the draft load.

14. A connection for transmitting draft from one vehicle to another, comprising two cooperating extensibly movable members, one of which members is adapted to be pivotally mounted on a vertical pivot at its front end on one vehicle for horizontal pivotal movement and against vertical movement, a hitch point at the rear of the other member adapted to be connected with the other vehicle, guide means on the other member, guide surfaces on the first mentioned member, the other member overlapping said first member with the guide means thereof in cooperative relationship with the guide surfaces of the first member to permit said other member to slide rearwardly relatively to the first member under draft load and in so doing to cause the rear portion of the other member having the hitch point to be lowered, and adjustable spring means for resisting such relative movement in opposition to the draft load, the front end of said other member being held by the guides in one horizontal plane during relative movement of said members, both of said cooperating members swinging together about the pivotal mounting of said one member into the line of draft as the draft is deflected laterally with respect to the longitudinal center line of said one vehicle.

WILLIAM L. PAUL.